United States Patent
Furubayashi et al.

[11] Patent Number: 5,310,610
[45] Date of Patent: May 10, 1994

[54] SILICON MICRO SENSOR AND MANUFACTURING METHOD THEREFOR

[75] Inventors: Hisatoshi Furubayashi; Yasuhiko Inami, both of Nara, Japan

[73] Assignee: Sharp Kabushiki Kaisha, Osaka, Japan

[21] Appl. No.: 981,898

[22] Filed: Nov. 20, 1992

Related U.S. Application Data

[63] Continuation of Ser. No. 800,767, Dec. 3, 1991, abandoned, which is a continuation of Ser. No. 346,785, May 3, 1989, abandoned.

[30] Foreign Application Priority Data

May 7, 1988 [JP] Japan ................................ 63-111290

[51] Int. Cl.$^5$ .......................................... G03C 3/00
[52] U.S. Cl. ..................... 430/11; 430/315; 430/316; 430/317; 73/717; 73/726; 73/727; 428/133; 427/74
[58] Field of Search ............ 430/315, 316, 317, 11; 73/717, 727, 726; 357/25, 24; 428/133; 427/74

[56] References Cited

U.S. PATENT DOCUMENTS

| | | | |
|---|---|---|---|
| 4,218,298 | 8/1980 | Shimada et al. | 357/25 |
| 4,668,374 | 7/1986 | Bhagat et al. | 204/412 |
| 4,670,092 | 6/1987 | Motamedi | 73/726 |
| 4,774,843 | 10/1988 | Ghiselin et al. | 73/727 |
| 4,791,465 | 12/1988 | Sakai et al. | 357/25 |
| 4,793,194 | 12/1988 | Wilner | 73/727 |
| 4,926,143 | 5/1990 | Harada et al. | 331/156 |
| 4,967,589 | 11/1990 | Yagawara et al. | 73/23.25 |
| 5,003,812 | 4/1991 | Yagawara et al. | 73/31.06 |

FOREIGN PATENT DOCUMENTS

| | | | |
|---|---|---|---|
| 103441 | 7/1980 | Japan | 73/726 |
| 2093272 | 1/1982 | United Kingdom | |
| 2179679 | 8/1986 | United Kingdom | |
| 2207804 | 2/1989 | United Kingdom | 73/727 |

OTHER PUBLICATIONS

European Patent Office Search Report.
J. Manaka et al, *Low Power Micro Gas Detector*, Ricoh Tech. Report No. 14, Nov., 1985, pp. 44 to 48 (English translation).
Bunji Hisamori, *Thermopile*, Sensor Gijutsu (Sensor technique), Jul., 1986, pp. 66 to 68 (English Translation).

*Primary Examiner*—Charles L. Bowers, Jr.
*Assistant Examiner*—Thomas R. Neville
*Attorney, Agent, or Firm*—Birch, Stewart, Kolasch & Birch

[57] ABSTRACT

A silicon micro sensor including a silicon substrate, a support element formed over an etched portion of the silicon substrate and a sensor element formed on the support element wherein the support element has a double layered structure including a silicon oxide film formed on the silicon substrate using the thermal oxidization method and an aluminum oxide film formed on the silicon oxide film using the sputtering method.

8 Claims, 3 Drawing Sheets

SILICON MICRO SENSOR AND MANUFACTURING METHOD THEREFOR

This application is a continuation of application Ser. No. 07/800,767 filed on Dec. 3, 1991, now abandoned, which is a continuation of application Ser. No. 07/346,785 filed on May 3, 1989 now abandoned.

BACKGROUND OF THE INVENTION

1. Field of the Invention

The present invention relates to a silicon micro sensor available to an infrared ray sensor, flow sensor, gas sensor, pressure sensor, vibration sensor, acceleration sensor or the like which is manufactured using an anisotropic etching method for machining a silicon substrate.

2. Description of Related Art

In an infrared ray sensor, flow sensor or gas sensor utilizing heat transfer, heater and detection elements thereof are made finer and as thin as possible since a higher sensitivity and responsibility and a lower consumption of electric power can be obtained by minimizing a heat compacitance of the heater element and the detection element.

Besides, in a sensor having a vibrating element such as a pressure sensor, a vibration sensor or an acceleration sensor, it becomes possible to minimize the dimensions of the sensor by thinning the vibration element and a support element for supporting the same and, thereby, the sensor is able to show a high sensitivity since the vibration element is vibrated by a minor force such as pressure.

Further, in all of these sensors, a high sensitivity, minimization of the size and hybridation or integration of plural sensors is possible by forming the sensing element on a support member formed with a thin film.

Due to these reasons, silicon micro sensors, wherein support elements are formed by thin films, have been developed in recent years using so called micro machining techniques wherein the photo-lithograpy techniques are applied for etching silicon elements into fine structures utilizing the crystal anisotropic property.

Meanwhile, there are many types of support elements for supporting a sensor element such as a bridge type, cantilever type and diaphragm type as shown in FIGS. 3, 4 and 5, respectively.

Upon manufacturing the silicon micro sensors of these types, silicon oxide films 111, 112, and 113 are formed on respective silicon substrates 101, 102 and 103 using the thermal oxidization method or the CVD method at first. Then, each of silicon oxide films 111 to 113 is patterned to form a mask and each of the silicon substrates 101 to 103 is etched anisotropically utilizing the anisotropic property thereof. Thus, support elements 121, 122 and 123 of a bridge type, cantilever type and diaphragm type are formed as portions of respective silicon oxide films 111, 112 and 113 used as a mask, as clearly shown in FIGS. 3(b), 4(b) and 5(b).

However, upon forming the silicon oxide film using the thermal oxidization method or the CVD method, the surface of the silicon substrate is heated up to a temperature of 600° to 1,000° C. At such a high temperature, thermal stress is caused in the silicon oxide film due to the difference between coefficients of thermal expansion of the silicon substrate and the silicon oxide film and, thereby, cracks and breaks are likely to be caused in the silicon oxide film. Accordingly, it is difficult to form the support film with the silicon oxide film alone.

In order to solve this problem, the present inventors proposed to use a silicon oxide film or a silicon nitride film formed by the sputtering method as the support film. However, in this case, the support film is bent slightly due to the residual stress remaining therein. The bend of the support film is impossible to remove by the thermal treatment in the case of the silicon oxide film, however, in the case of the silicon nitride film, it is possible to remove the bend by processing the support film thermally at a temperature of 800° C. or more. In the latter case, many problems are caused by the thermal treatment at such a high temperature.

On the other hand, it may be considered to use an aluminum oxide film formed as the support film by the sputtering method. Although the film is slightly bent also in the case of the aluminum oxide film, the bend thereof can be removed by the thermal treatment at a relatively low temperature about 500° C. The reason why it is possible at such a low temperature is that the aluminum oxide has a coefficient of thermal expansion greater than that of the silicon nitride. However, many defects due to contaminants such as dusts are contained in the aluminum oxide film and, therefore, upon etching the silicon substrate, the etchant penetrating through these defects causes etch pits therein.

SUMMARY OF THE INVENTION

One object of the present invention is to provide a silicon micro sensor comprising a support film of two layers for supporting a sensing element which is flat and free from cracks and breaks.

Another object of the present invention is to provide a forming method for a support film for supporting a sensing element, wherein the support film is formed by a silicon oxide film made using the thermal oxidization method and an aluminum oxide film formed stacked on the silicon oxide film using the sputtering method.

In order to achieve these objects, according to the present invention, there is provided a silicon micro sensor in which a support film is formed on a silicon substrate, the silicon substrate is etched using the support film as a mask for etching and a sensor film is formed on the portion of the support film locating at the etched portion of the silicon substrate, being characterized in that:

the support film has a double layered structure being comprised of a silicon oxide film formed on the silicon substrate using the thermal oxidization method and an aluminum oxide film formed stacked on the silicon oxide film using the sputtering method.

The present invention also provides a manufacturing method for a support film of a silicon micro sensor which supports a sensor element thereon comprising:

a step for forming a silicon oxide film on a silicon substrate using the thermal oxidization method;

a step for forming an aluminum oxide film on the silicon oxide film using the sputtering method;

a step for forming a mask for etching by processing the aluminum oxide film and the silicon oxide film using the photolithography technique; and a step for etching the silicon substrate using the mask to form the support element for the sensor element.

In this structure, it is desirable to form the aluminum oxide film so as to have a thickness greater than that of the silicon oxide film. The aluminum oxide film, if it is thicker than the silicon oxide film, is hardly affected by the residual stress remaining in the silicon oxide film due to the thermal stress caused during the thermal oxidation processing. However, small residual stress (compression stress) remains in the aluminum oxide film in this stage. In order to release the residual stress in the aluminum oxide film, it is desirable to thermally treat it at a temperature of 500° to 800° C., preferably, 600° to 700° C. Since the coefficient of thermal expansion of the aluminum oxide film is greater than that of the silicon substrate, tension stress is generated during the thermal treatment and, thereby, the residual stress in the aluminum oxide film is cancelled.

Further, if the temperature for the thermal treatment is set at a higher level within the range of 500° to 800° C., suitable tension stress remains in the support film. The residual stress contributes to flatten the surface of the aluminum oxide film.

Upon etching the silicon substrate, the silicon oxide film of the support film serves to prevent the silicon substrate from etch pits which might be caused if the support film is comprised of a single layer of aluminum oxide.

On the support element thus formed, a sensor element such as a thin film is formed in order to obtain a silicon micro sensor. The silicon micro sensor thus manufactured has no etch pits in the silicon substrate thereof and a flat support element.

BRIEF DESCRIPTION OF DRAWINGS

These and other objects and features of the present invention will become more apparent when the preferred embodiment of the present invention is described in detail with reference of accompanied drawings in that.

DETAILED DESCRIPTION OF THE PREFERRED EMBODIMENT

Figure 1A:
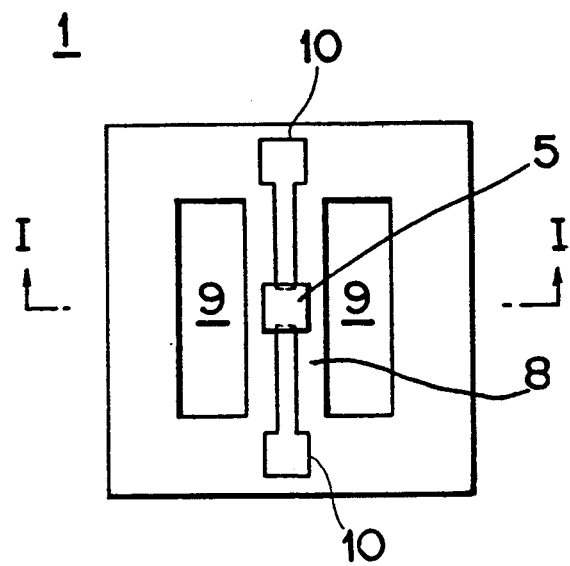
FIG. 1(a) is a plan view of the silicon micro sensor according to the present invention.
Figure 1B:
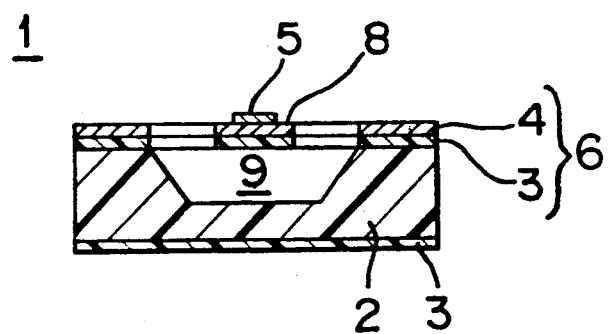
FIG. 1(b) is a cross-sectional view of the silicon micro sensor along I—I line of FIG. 1(a)

FIG. 1(a) shows a plan view of the silicon micro sensor of a bridge type according to the preferred embodiment of the present invention and FIG. 1(b) shows a cross-section of the silicon micro sensor along I—I line of FIG. 1(a).

As shown in FIGS. 1(a) and 1(b), the silicon micro sensor 1 is comprised of a silicon substrate 2, a silicon oxide film 3 formed by the thermal oxidization method, an aluminum oxide film 4 formed on the silicon oxide film and a sensor film 5 formed on the aluminum oxide film 4.

Next, the method for manufacturing the silicon micro sensor will be explained referring to FIGS. 2(a) to 2(e) showing thermal oxidization, sputtering, thermal treatment, etching and sensor film forming processes, respectively.

Figure 2A:
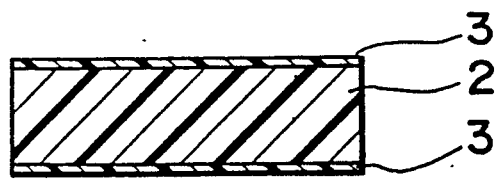
FIGS. 2(a), 2(b), 2(c), 2(d) and 2(e) are cross-sectional views for showing steps of the manufacturing method for the silicon micro sensor according to the present invention, respectively.

In the thermal oxidization process, as shown in FIG. 2(a), main surfaces of the silicon substrate 2 are oxidized using the thermal oxidization method to form silicon oxide films 3, 3 having a thickness of about 100 Å to several thousand Å, respectively.

Figure 2B:
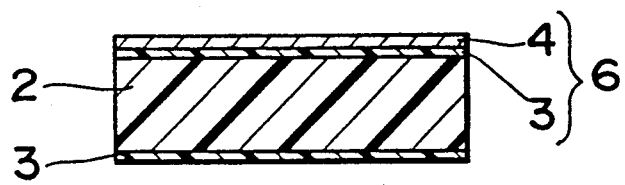

In the sputtering process, as shown in FIG. 2(b), an aluminum oxide film 4 is formed on the upper silicon oxide film 3 so as to have a thickness of 1,000 Å to several μms using the sputtering method.

The sputtering process is performed by radio-frequency magnetron sputtering of sintered $Al_2O_3$ target in Ar gas. Upon sputtering it, the silicon substrate 2 is heated up to about 300° C. and the sputtering electric power is about 3 $W/cm^2$. The aluminum oxide film 3 is desirably formed so as to have a thickness than silicon oxide film 3. Thus, the silicon oxide film 3 and the aluminum oxide film 4 are formed stacked on the surface of the silicon substrate 2. These two oxide films form a support film 6.

In the thermal treatment process, the silicon substrate 2 on which the silicon oxide film 3 and the aluminum oxide film 4 are formed is treated thermally at a temperature of 500° C. to 800° C., preferably at 700° C., for three hours in order to sinter the support film 6.

Figure 2C:
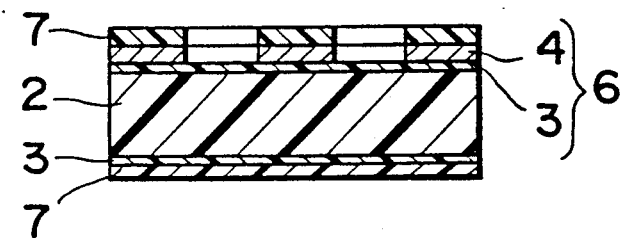

In the etching process, as shown in FIG. 2(c), a photoresist film 7 having a predetermined pattern such as a bridge type pattern is formed on the aluminum oxide film 4 and the lower silicon oxide film 3 is covered with another photoresist film 7 entirely at first. Thereafter, the aluminum oxide film 4 is etched so as to have the same pattern as that of the upper photoresist film 7 using phosphoric acid.

Figure 2D:
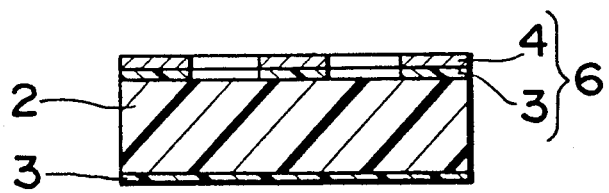

Next, the upper silicon oxide film 3 is etched using buffered hydrofluoric acid, as shown in FIG. 2(d) and, then, the upper and lower photoresist films 7 and 7 are removed.

Figure 2E:
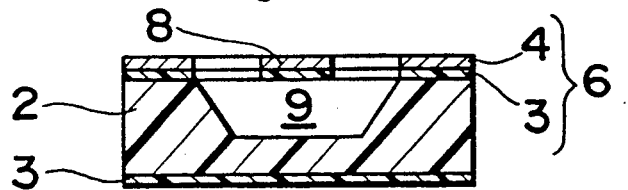
Figure 3A:
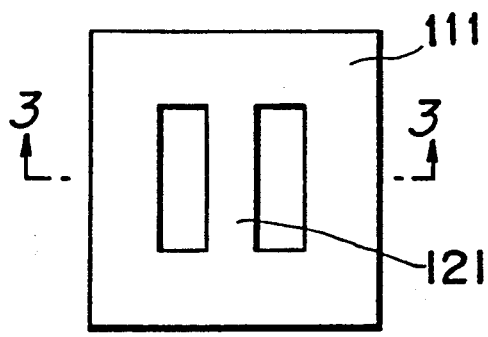
FIGS. 3(a), 4(a) and 5(a) are plan views of conventional silicon micro sensors of a bridge type, cantilever type and diaphragm type, respectively.
Figure 4A:
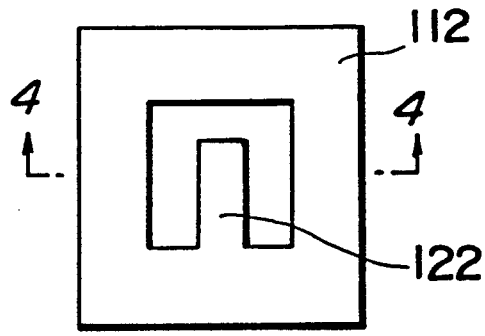
Figure 3B:
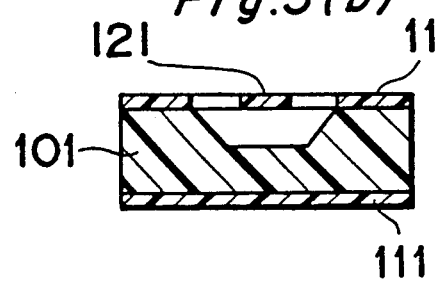
FIGS. 3(b), 4(b) and 5(b) are cross-sectional views along III—III, IV—IV and V—V lines of FIGS. 3(a), 4(a) and 5(a), respectively.
Figure 4B:
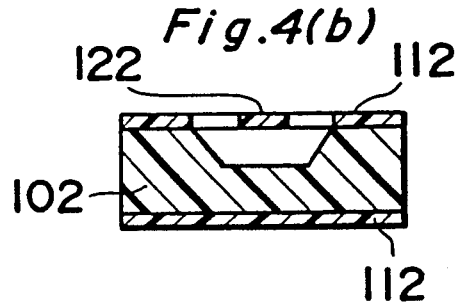
Figure 5A:
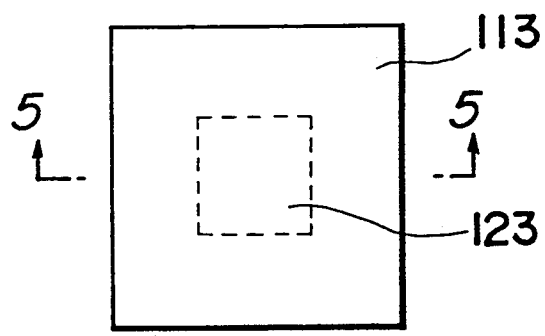
Figure 5B:
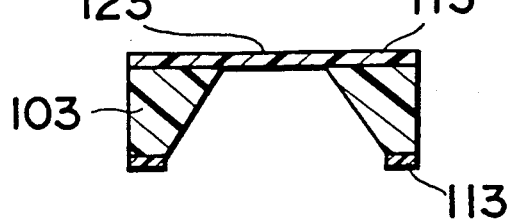

Then, the silicon substrate 2 covered with a mask comprised of the aluminum oxide film 4 and the silicon oxide film 3 is etched using EPW liquid (mixture of ethylenediamine, pyrocatechol and water) being heated up to a temperature near the boiling point thereof. As shown in FIG. 2(e), a hollow portion 9 is formed in the silicon substrate 2 as the result of the etching and the portion of the support film 6 bridged over the hollow portion 9 constitutes a support element 8 for supporting the sensor element. Thereafter, a sensor film 5 and electrodes 10 and 10 thereof are formed on the support element 8, as shown in FIGS. 1(a) and 1(b), and, thereby, a complete silicon micro sensor is obtained.

The silicon micro sensor 1 thus obtained has various merits as follows.

First of all, the surface of the support film 6 is flattened by the tensile force which is generated in the aluminum oxide film 4 during the thermal treatment process since coefficient of the thermal expansion of the aluminum oxide film 4 is greater than that of the silicon substrate 2.

Secondly, the etch pit is never caused upon etching the silicon substrate 2 since the support film 6 acting as a mask for etching includes the silicon oxide film 3 which is capable of preventing the etchant from penetrating therethrough.

Thus, according to the present invention, silicon micro sensors having a high performance and reliability as products can be obtained.

Further, in the manufacturing method for silicon micro sensors, only innoxious gas such as argon gas is used upon forming films and, accordingly, the cost of the manufacturing equipment is lowered in comparison of the conventional one for using the CVD method.

Also, according to the present invention, the thermal treatment can be done at a relatively low temperature. Therefore, heat damage to individual portions of the sensor can be avoided.

As to the sensor film 5, various materials are utilized in accordance with the use of the silicon micro sensor such as an infrared sensor, a gas sensor, a humidity sensor, a pressure sensor or the like.

Only the bridge type sensor is explained in the preferred embodiment of the present invention, however, the present invention is applicable to the cantilever type sensor and/or the diaphragm type sensor.

The preferred embodiments described herein are illustrative and not restrictive, the scope of the invention being indicated by the appended claims and all variations which come within the meanings of the claims are intended to be embraced herein.

What is claimed is:

1. A silicon micro sensor comprising:
    a silicon substrate;
    a support film overlaying said substrate, said support film including a lower layer of silicon oxide film applied by a thermal oxidization method and an upper layer of aluminum oxide film applied by a sputtering method wherein the thickness of the aluminum oxide film is thicker than that of the silicon oxide film, said layers of said support film being heated at a predetermined temperature for a predetermined time thereby providing a flat stable configuration;
    a support element formed from a portion of said support film at an etched portion of said substrate; and
    a sensor element and electrode members applied to said support element.

2. The silicon micro sensor according to claim 1, wherein said support element is in the shape of a micro-bridge.

3. The silicon micro sensor according to claim 1, wherein said support element is cantilevered with respect to a remaining portion of said support film.

4. The silicon micro sensor according to claim 1, wherein said support element is formed as a diaphragm over the etched portion of said substrate.

5. The silicon micro sensor according to claim 1, wherein said predetermined temperature is in the range of 500° C. to 800° C., and wherein said predetermined time is three hours.

6. The silicon micro sensor according to claim 2, wherein said predetermined temperature is in the range of 500° C. to 800° C., and wherein said predetermined time is three hours.

7. The silicon micro sensor according to claim 3, wherein said predetermined temperature is in the range of 500° C. to 800° C., and wherein said predetermined time is three hours.

8. The silicon micro sensor according to claim 4, wherein said predetermined temperature is in the range of 500° C. to 800° C., and wherein said predetermined time is three hours.

* * * * *